US012646291B2

(12) United States Patent
Iventosch et al.

(10) Patent No.: US 12,646,291 B2
(45) Date of Patent: Jun. 2, 2026

(54) METHOD FOR SCALING FINE-GRAINED OBJECT RECOGNITION OF CONSUMER PACKAGED GOODS

(71) Applicant: Pensa Systems, Inc., Austin, TX (US)

(72) Inventors: Joel Iventosch, Austin, TX (US); James E. Dutton, Clinton, AR (US)

(73) Assignee: Pensa Systems, Inc., Austin, TX (US)

( * ) Notice: Subject to any disclaimer, the term of this patent is extended or adjusted under 35 U.S.C. 154(b) by 550 days.

(21) Appl. No.: 17/849,341

(22) Filed: Jun. 24, 2022

(65) Prior Publication Data

US 2022/0415029 A1 Dec. 29, 2022

Related U.S. Application Data

(60) Provisional application No. 63/214,414, filed on Jun. 24, 2021.

(51) Int. Cl.
| | |
|---|---|
| *G06V 10/77* | (2022.01) |
| *G06V 10/26* | (2022.01) |
| *G06V 10/764* | (2022.01) |
| *G06V 10/774* | (2022.01) |
| *G06V 10/82* | (2022.01) |

(52) U.S. Cl.
CPC .......... *G06V 10/7715* (2022.01); *G06V 10/26* (2022.01); *G06V 10/764* (2022.01); *G06V 10/774* (2022.01); *G06V 10/82* (2022.01)

(58) Field of Classification Search
CPC .... G06V 10/7715; G06V 10/82; G06V 10/26; G06V 10/774; G06V 10/764
See application file for complete search history.

(56) References Cited

U.S. PATENT DOCUMENTS

| | | | | |
|---|---|---|---|---|
| 9,569,692 B2* | 2/2017 | Xie | ........................ | G06V 20/00 |
| 9,848,150 B2* | 12/2017 | Uchida | ............... | H03M 1/1028 |
| 10,242,036 B2* | 3/2019 | Kwon | ................... | G06F 18/254 |

(Continued)

OTHER PUBLICATIONS

Chen, Wei-Yu, et al. "A Closer Look At Few-Shot Classification." ICLR, 2019, pp. 1-16.

(Continued)

*Primary Examiner* — Gregory M Desire
(74) *Attorney, Agent, or Firm* — John A. Fortkort; Fortkort & Houston PC

(57) ABSTRACT

A method is provided for assigning a classification to consumer packaged goods (CPGs). The method includes capturing an image of a plurality of CPGs arranged on a shelf; providing the captured image to a CPG detector; identifying all of the CPGs in the image; producing a set of cropped images, wherein each cropped image shows a single CPG as it appears in the image; and for each member of the set of cropped images, assigning a classification to the CPG in the member of the set of cropped images and establishing a confidence for the assigned classification through a process that includes the steps of (a) identifying a first set of reference images of CPGs whose classification is known, wherein each member of the first set of reference images is semantically similar to the member of the set of cropped images, and (b) identifying details in the member of the set of cropped images that differentiates it from a second set of reference images of CPGs whose classification is known.

24 Claims, 4 Drawing Sheets

(56)                    References Cited

U.S. PATENT DOCUMENTS

| | | | |
|---|---|---|---|
| 10,467,501 B2* | 11/2019 | N | G06N 3/082 |
| 10,664,722 B1* | 5/2020 | Sharma | G06F 18/22 |
| 10,885,395 B2 | 1/2021 | Iventosch et al. | |
| 11,106,901 B2* | 8/2021 | He | G06V 40/107 |
| 11,314,992 B2 | 4/2022 | Iventosch et al. | |
| 11,531,838 B2* | 12/2022 | Siskind | G06Q 10/087 |
| 11,544,501 B2* | 1/2023 | Dong | G06N 3/08 |
| 2019/0385106 A1 | 12/2019 | Iventosch et al. | |
| 2022/0044298 A1 | 2/2022 | Oshinaike et al. | |

OTHER PUBLICATIONS

Xu, Jiaming, et al. "Convolutional Neural Networks for Text Hashing." Proceedings of the 24th International Joint Conference on Artificial Intelligence, 2015, pp. 1369-1375.

Lai, Hanjiang, et al. "Simultaneous Feature Learning and Hash Coding with Deep Neural Networks." 2015 IEEE Conference on Computer Vision and Pattern Recognition (CVPR), Apr. 14, 2015, pp. 3270-3278., doi:10.1109/cvpr.2015.7298947.

Cao, Yue, et al. "Correlation Hashing Network for Efficient Cross-Modal Retrieval." Procedings of the British Machine Vision Conference 2017, Feb. 20, 2017, doi:10.5244/c.31.128.

Xian, Yongqin, et al. "Zero-Shot Learning—A Comprehensive Evaluation of the Good, the Bad and the Ugly." IEEE Transactions on Pattern Analysis and Machine Intelligence, vol. 41, No. 9, Jan. 2019, pp. 2251-2265., doi:10.1109/tpami.2018.2857768.

Wang, Xiaolong, et al. "Zero-Shot Recognition via Semantic Embeddings and Knowledge Graphs." 2018 IEEE/CVF Conference on Computer Vision and Pattern Recognition, Apr. 8, 2018, doi:10.1109/cvpr.2018.00717.

Zhu, Pengkai, et al. "Generalized Zero-Shot Recognition Based on Visually Semantic Embedding." 2019 IEEE/CVF Conference on Computer Vision and Pattern Recognition (CVPR), Apr. 9, 2019, doi:10.1109/cvpr.2019.00311.

Schonfeld, Edgar, et al. "Generalized Zero- and Few-Shot Learning via Aligned Variational Autoencoders." 2019 IEEE/CVF Conference on Computer Vision and Pattern Recognition (CVPR), Apr. 5, 2019, doi:10.1109/cvpr.2019.00844.

Atzmon, Yuval, and Gal Chechik. "Adaptive Confidence Smoothing for Generalized Zero-Shot Learning." 2019 IEEE/CVF Conference on Computer Vision and Pattern Recognition (CVPR), May 13, 2019, doi:10.1109/cvpr.2019.01194.

Zhao, An, et al. "Domain-Invariant Projection Learning for Zero-Shot Recognition." Proceedings of the 32nd Conference on Neural Information Processing Systems (NeurIPS), 2018.

Liu, Shichen, et al. "Generalized Zero-Shot Learning with Deep Calibration Network." Proceedings of the 32nd Conference on Neural Information Processing Systems (NeurIPS), 2018.

Yu, Yunlong, et al. "Stacked Semantics-Guided Attention Model for Fine-Grained Zero-Shot Learning." Proceedings of the 32nd Conference on Neural Information Processing Systems (NeurIPS), 2018.

Guo, Yuchen, et al. "Zero-Shot Recognition via Direct Classifier Learning with Transferred Samples and Pseudo Labels." Proceedings of the Thirty-First AAAI Conference on Artificial Intelligence (AAAI-17), 2017.

Wang, Wenlin, et al. "Zero-Shot Learning via Class-Conditioned Deep Generative Models." Proceedings of the Thirty-Second AAAI Conference on Artificial Intelligence (AAAI-18), 2018.

Cao, Yue et al. "Collective Deep Quantization for Efficient Cross-Modal Retrieval." Proceedings of the Thirty-First AAAI Conference on Artificial Intelligence (AAAI-17), 2017.

Jiang, Qing-Yuan, and Wu-Jun Li. "Deep Cross-Modal Hashing." 2017 IEEE Conference on Computer Vision and Pattern Recognition (CVPR), 2017, doi:10.1109/cvpr.2017.348.

Chen, Binghui, and Weihong Deng. "Hybrid-Attention Based Decoupled Metric Learning for Zero-Shot Image Retrieval." 2019 IEEE/CVF Conference on Computer Vision and Pattern Recognition (CVPR), 2019, doi:10.1109/cvpr.2019.00286.

Lin, Kevin, et al. "Deep Learning of Binary Hash Codes for Fast Image Retrieval." 2015 IEEE Conference on Computer Vision and Pattern Recognition Workshops (CVPRW), 2015, doi:10.1109/cvprw.2015.7301269.

Cao, Yue, et al. "Deep Cauchy Hashing for Hamming Space Retrieval." 2018 IEEE/CVF Conference on Computer Vision and Pattern Recognition, 2018, doi:10.1109/cvpr.2018.00134.

Zhu, Han et al. "Deep Hashing Network for Efficient Similarity Retrieval." Proceedings of the Thirtieth AAAI Conference on Artificial Intelligence (AAAI-16), 2016.

Cao, Yue et al. "Deep Quantization Network for Efficient Image Retrieval." Proceedings of the Thirtieth AAAI Conference on Artificial Intelligence (AAAI-16), 2016.

Cao, Yue, et al. "Deep Visual-Semantic Quantization for Efficient Image Retrieval." 2017 IEEE Conference on Computer Vision and Pattern Recognition (CVPR), 2017, doi:10.1109/cvpr.2017.104.

Cao, Zhangjie, et al. "HashNet: Deep Learning to Hash by Continuation." 2017 IEEE International Conference on Computer Vision (ICCV), 2017, doi:10.1109/iccv.2017.598.

Jiang, Huajie, et al. "Learning Class Prototypes via Structure Alignment for Zero-Shot Recognition." Computer Vision—ECCV 2018 Lecture Notes in Computer Science, 2018, pp. 121-138., doi:10.1007/978-3-030-01249-6_8.

Li, Wu-Jun, Sheng Wang, and Wang-Cheng Kang. "Feature learning based deep supervised hashing with pairwise abels." 2015, doi:arXiv:1511.03855.

Song, Jie, et al. "Selective Zero-Shot Classification with Augmented Attributes." Computer Vision—ECCV 2018 Lecture Notes in Computer Science, 2018, pp. 474-490., doi:10.1007/978-3-030-01240-3_29.

Lee, Chung-Wei, et al. "Multi-Label Zero-Shot Learning with Structured Knowledge Graphs." 2018 IEEE/CVF Conference on Computer Vision and Pattern Recognition, 2018, doi:10.1109/cvpr.2018.00170.

Niu, Li, et al. "Webly Supervised Learning Meets Zero-Shot Learning: A Hybrid Approach for Fine-Grained Classification." 2018 IEEE/CVF Conference on Computer Vision and Pattern Recognition, 2018, doi:10.1109/cvpr.2018.00749.

"One-Shot Learning." Wikipedia, Wikimedia Foundation, Mar. 27, 2020, en.wikipedia.org/wiki/One-shot_learning.

Felix, Rafael, et al. "Multi-Modal Cycle-Consistent Generalized Zero-Shot Learning." Computer Vision—ECCV 2018 Lecture Notes in Computer Science, 2018, pp. 21-37., doi:10.1007/978-3-030-01231-1_2.

Cao, Yue, et al. "Deep Visual-Semantic Hashing for Cross-Modal Retrieval." Proceedings of the 22nd ACM SIGKDD International Conference on Knowledge Discovery and Data Mining—KDD 16, 2016, doi:10.1145/2939672.2939812.

Verma, Vinay Kumar, et al. "Generalized Zero-Shot Learning via Synthesized Examples." 2018 IEEE/CVF Conference on Computer Vision and Pattern Recognition, 2018, doi:10.1109/cvpr.2018.00450.

Sinha, Smita. "What Is Zero-Shot Learning?" Analytics India Magazine, Jun. 18, 2018, analyticsindiamag.com/what-is-zero-shot-learning/.

Xian, Yongqin, et al. "Feature Generating Networks for Zero-Shot Learning." 2018 IEEE/CVF Conference on Computer Vision and Pattern Recognition, 2018, doi:10.1109/cvpr.2018.00581.

Zhao, Fang, et al. "Deep Semantic Ranking Based Hashing for Multi-Label Image Retrieval." 2015 IEEE Conference on Computer Vision and Pattern Recognition (CVPR), 2015, doi:10.1109/cvpr.2015.7298763.

Grover D, Bauhoff S, Friedman J (2019) Using supervised learning to select audit targets in performance-based financing in health: An example from Zambia. PLoS One 14(1): e0211262. https://doi.org/10.1371/journal.pone.0211262.

Rich, Michael D.; Mills, Robert F.; Dube, Thomas E.; and Rogers, Steven K. (2016) "Evaluating Machine Learning Classifiers for Defensive Cyber Operations," Military Cyber Affairs: vol. 2 : Iss. 1, Article 6. https://www.doi.org/http://doi.org/10.5038/2378-0789.2.1.1005.

Nishtha Hooda, Seema Bawa & Prashant Singh Rana (2020) Optimizing Fraudulent Firm Prediction Using Ensemble Machine

(56) References Cited

OTHER PUBLICATIONS

Learning: A Case Study of an External Audit, Applied Artificial Intelligence, 34:1, 20-30, DOI: 10.1080/08839514.2019.1680182.
Eid, FE., Elmarakeby, H.A., Chan, Y.A. et al. Systematic auditing is essential to debiasing machine learning in biology. Commun Biol 4, 183 (2021). https://doi.org/10.1038/s42003-021-01674-5.
Hooda, N., Bawa, S., & Rana, P.S. (2018). Fraudulent Firm Classification: A Case Study of an External Audit. Applied Artificial Intelligence, 32, 48-64.
Barredo-Arrieta, A., & Del Ser, J. (2020). Plausible Counterfactuals: Auditing Deep Learning Classifiers with Realistic Adversarial Examples. 2020 International Joint Conference on Neural Networks (IJCNN), 1-7.
San Diego Now Intelligence, published by ServiceNow (Jun. 2, 2022).

* cited by examiner

METHOD FOR SCALING FINE-GRAINED OBJECT RECOGNITION OF CONSUMER PACKAGED GOODS

CROSS-REFERENCE TO RELATED APPLICATION

This application claims the benefit of priority from U.S. Provisional Patent Application No. 63/214,414, which was filed on Jun. 24, 2021, which has the same title and inventors, and which is incorporated herein by reference in its entirety.

FIELD OF THE DISCLOSURE

The present application relates generally to object recognition from images, and more specifically to systems and methodologies for the recognition and prediction of semantic events learned through repeated observation of Consumer Packaged Goods (CPGs).

BACKGROUND OF THE DISCLOSURE

Merchandise that consumers use up and replace on a frequent basis are known in the industry as Consumer Packaged Goods (CPGs). Brick and mortar establishments that buy and sell such merchandise are an important part of the economy. These establishments typically employ sophisticated automation systems to track what comes in (supply chain management systems) and what goes out (point of sale systems), but often have little visibility into what happens to the products in between.

Recent advances in artificial intelligence make it feasible to survey, count, and track the movement of inventory during this period in a completely automated and objective way. One key component of this technology is the use of artificial neural networks to recognize objects from camera images. In particular, the advent of deep convolutional neural networks (CNNs) as a mechanism for recognizing individual objects within an image or image stream (video) has revolutionized the field. See, for example, A. Krizhevsky, I. Sutskever, and G. E. Hinton, "Imagenet classification with deep convolutional neural networks", *Advances in Neural Information Processing Systems*, pages 1097-1105 (2012).

In the past five years, refinements to CNNs, such as augmenting a CNN with a Region Proposal Network (R-CNN), have made it possible to recognize and distinguish dozens, and even hundreds, of different object categories. See Shaoqing Ren, Kaiming He, Ross Girshick, Jian Sun, "Faster R-CNN: Towards Real-Time Object Detection and Region Proposal Networks" (2016), available online at https://arxiv.org. A yearly industry-wide contest known as "The ImageNet Large Scale Visual Recognition Challenge" (described online at http://image-net.org) is designed to push the limits of automatic object recognition and localization. At present, this contest challenges researchers worldwide to design systems that can recognize up to 1,000 distinct object classes.

SUMMARY OF THE DISCLOSURE

Figure 1:
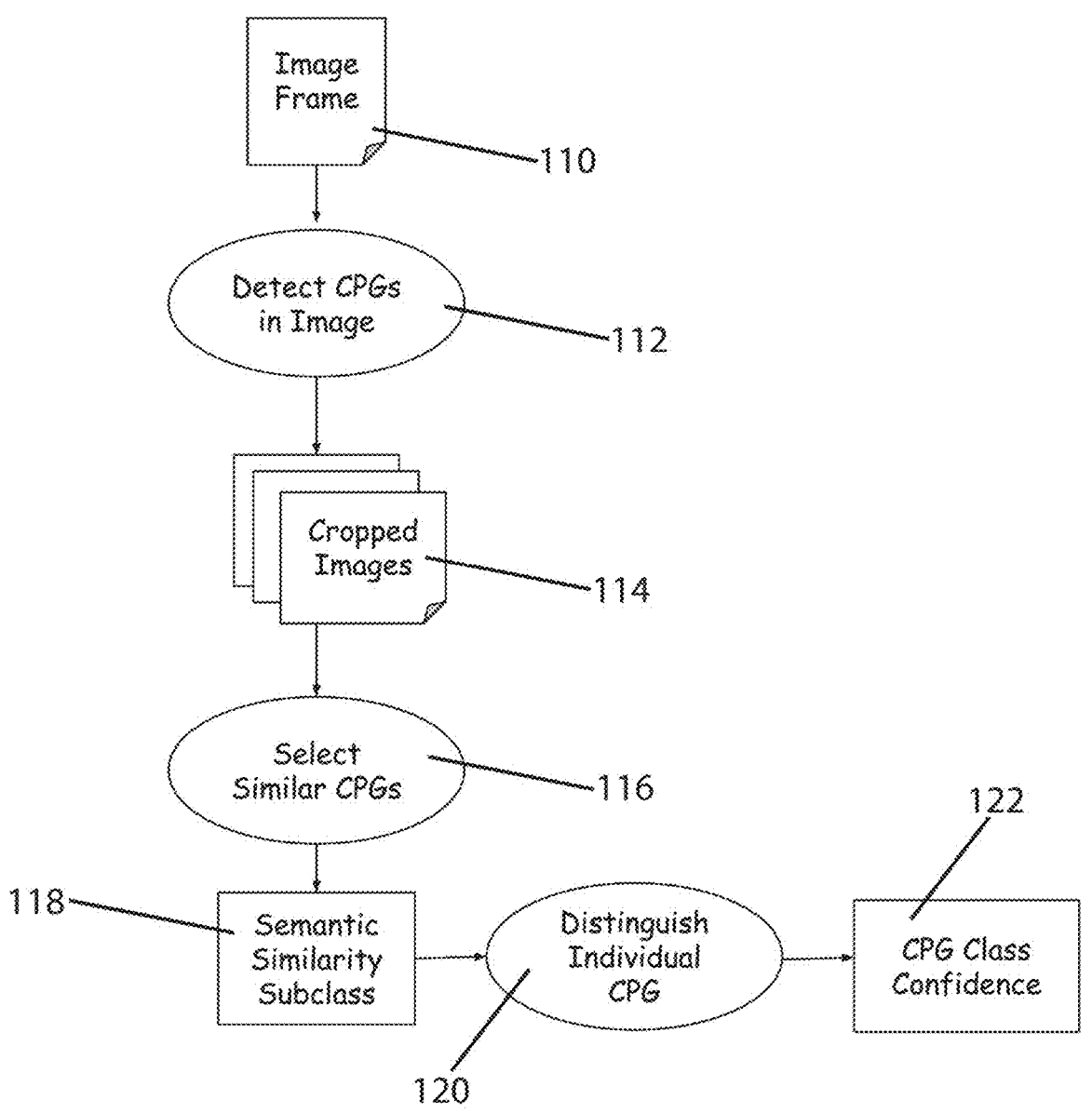
FIG. 1 is a high-level flow chart of the present disclosure depicting the run-time regime of classification models.

In one aspect, a method is provided for assigning a classification to consumer packaged goods (CPGs). The method comprises capturing an image of a plurality of CPGs arranged on a shelf; providing the captured image to a CPG detector; identifying all of the CPGs in the image; producing a set of cropped images, wherein each cropped image shows a single CPG as it appears in the image; and for each member of the set of cropped images, assigning a classification to the CPG in the member of the set of cropped images and establishing a confidence for the assigned classification through a process that includes the steps of (a) identifying a first set of reference images of CPGs whose classification is known, wherein each member of the first set of reference images is semantically similar to the member of the set of cropped images, and (b) identifying details in the member of the set of cropped images that differentiates it from a second set of reference images of CPGs whose classification is known.

In another aspect, a system is provided for assigning a classification to consumer packaged goods (CPGs). The system comprises (a) an image capture device mounted on a mobile platform, said image capture device being adapted to capture images of CPGs arranged on a shelf; (b) a CPG detector which accepts images captured by the image capture device and which identifies CPGs in the captured images; (c) an image cropper which produces cropped images from the captured images such that each cropped image shows a single CPG as it appears in the image; and (d) a classifier which operates on each cropped image produced by the image cropper to assign a classification to the CPG in the cropped image and to establish a confidence for the assigned classification, wherein the classifier (i) identifies a first set of reference images of CPGs whose classification is known, wherein each member of the first set of reference images is semantically similar to the member of the set of cropped images, and (ii) identifies details in the member of the set of cropped images that differentiates it from a second set of reference images of CPGs whose classification is known.

DETAILED DESCRIPTION

Attempts to apply these research results to the present problem of recognizing CPGs in real world environments have encountered at least two important obstacles. First, the ImageNet Challenge and related research is typically focused on the problem of recognizing broad categories of objects, such as "dogs" or "faces", that appear only once or twice in any given image. CPGs, on the other hand, are typically displayed in densely-packed arrangements (on a shelf at a grocery store for example). Moreover, CPGs need to be categorized in a much more fine-grained manner, typically down to the actual SKU or product code.

A further problem with current approaches when applied to CPG recognition is the sheer number of categories that must be distinguished. Thus, a typical grocery store might display products having up to 50,000 different SKUs, and superstores can contain up to twice that number. These numbers are orders of magnitude greater than the current state of the art for automated object recognizers.

Academic efforts to go from hundreds to thousands of recognized categories include attempts to decouple the task of object detection (automatically drawing a bounding box around an object of interest) and classification (determining the most likely category of the object within the bounding box). By contrast, existing approaches in industry often attempt to perform both those tasks simultaneously in order to improve recognition speed, but this comes at the expense of scalability.

One promising new approach to scaling object recognition is to derive a few (<100) abstract superclasses of objects by clustering deep semantic features of thousands of training images. Those superclasses may then be utilized to aid in object detection (Bharat Singh, Hengduo Li, Abhishek Sharma, Larry S. Davis. R-FCN-3000 at 30 fps: Decoupling Detection and Classification. http://www.cs.umd. edu/~bharat/rfcn-3k.pdf, 2017). After an object has been detected, the image can be cropped and passed to a fine-grained object classifier. One very interesting result of this work is that, even if the number of derived superclasses is reduced to just one, the overall detection and recognition accuracies for untrained images are still quite good, even at scale. In other words, generic "objectness" seems to be a robust and stable trait, at least among the images in the ImageNet data set.

Applying this decoupled approach to in situ images of CPGs, however, does not yield similarly promising results. One problem is that CPGs in those images (unlike objects in ImageNet images) are not sparse, isolated, and surrounded by background. Rather, they are densely-packed, numerous, and surrounded mostly by other CPGs.

There is thus a need in the art for systems and methodologies that may be utilized to automatically recognize and account for tens of thousands of fine-grained CPG categories from digital images. There is further a need for such systems and methodologies which may be applied to densely-packed products displayed in their natural, ready-for-sale state.

Commonly assigned U.S. Pat. No. 10,885,395 (Iventosch et al.), which is incorporated herein by reference in its entirety, discloses a scalable CPG recognition system described a CPG Detector that pre-classifies each image into one of a small number of superclasses. Each superclass, containing objects that are semantically similar to one another, is then associated with a sub-classifier model which distinguishes among all the CPGs of a superclass, resulting in a single CPG class (i.e., a SKU or UPC) along with a confidence score for the classification.

It has now been found that the foregoing needs in the art may be addressed by expanding the approach of Iventosch et al. with a hierarchical classifier that selects a small set of semantically similar objects to serve as dynamically-determined superclasses. In addition, in some embodiments, the plurality of separately trained sub-classifiers may be replaced with a single subclassifier trained to recognize (often minute) differences between individual CPGs in the same semantic superclass.

The overall mode of operation for preferred embodiments of the scalable machine learning approach disclosed herein may be characterized as "compare and contrast." Within the training regime, the models learn in a manner similar to the way human children learn to classify or name things. When a child first encounters a new object or animal (say, a zebra), they do not begin afresh by identifying all the features and characteristics of the zebra (four legs, mane, tail, long face, etc.) that qualify its existence in the class of all zebras. Instead, they generally compare it to something else they already know how to identify and remember just the differences between the two classes. For example, a zebra is like a horse with stripes. This is a much more efficient way to learn new classes and to encode those classes within neural networks, both biological and artificial. The strategy involves just two activities when learning a new class: (1) compare the new thing with all the other things one already knows, thereby identifying a small set of semantically similar objects, and (2) contrast the new thing with one or two of the similar objects, remembering only the differences between them.

Referring to the drawings, in which like reference designators refer to like elements, there is shown in FIG. 1 a high-level flow chart of the present disclosure depicting the run-time regime of the classification models. A digital image of a grocery shelf 110 is presented to the CPG detector 112 which finds all the products present in the image. The detector produces a set of cropped images 114, each of which shows a single CPG instance as it appeared on the grocery shelf image. The scalable classifier system disclosed herein then processes each cropped image 116 by first finding a small set of reference images 118 of existing products that it already knows how to classify and which are semantically similar to the cropped image being classified. The classifier then identifies fine details in the cropped image that discriminates it from other similar products 120 to produce 122 a singular class and confidence for each cropped image.

Figure 2:
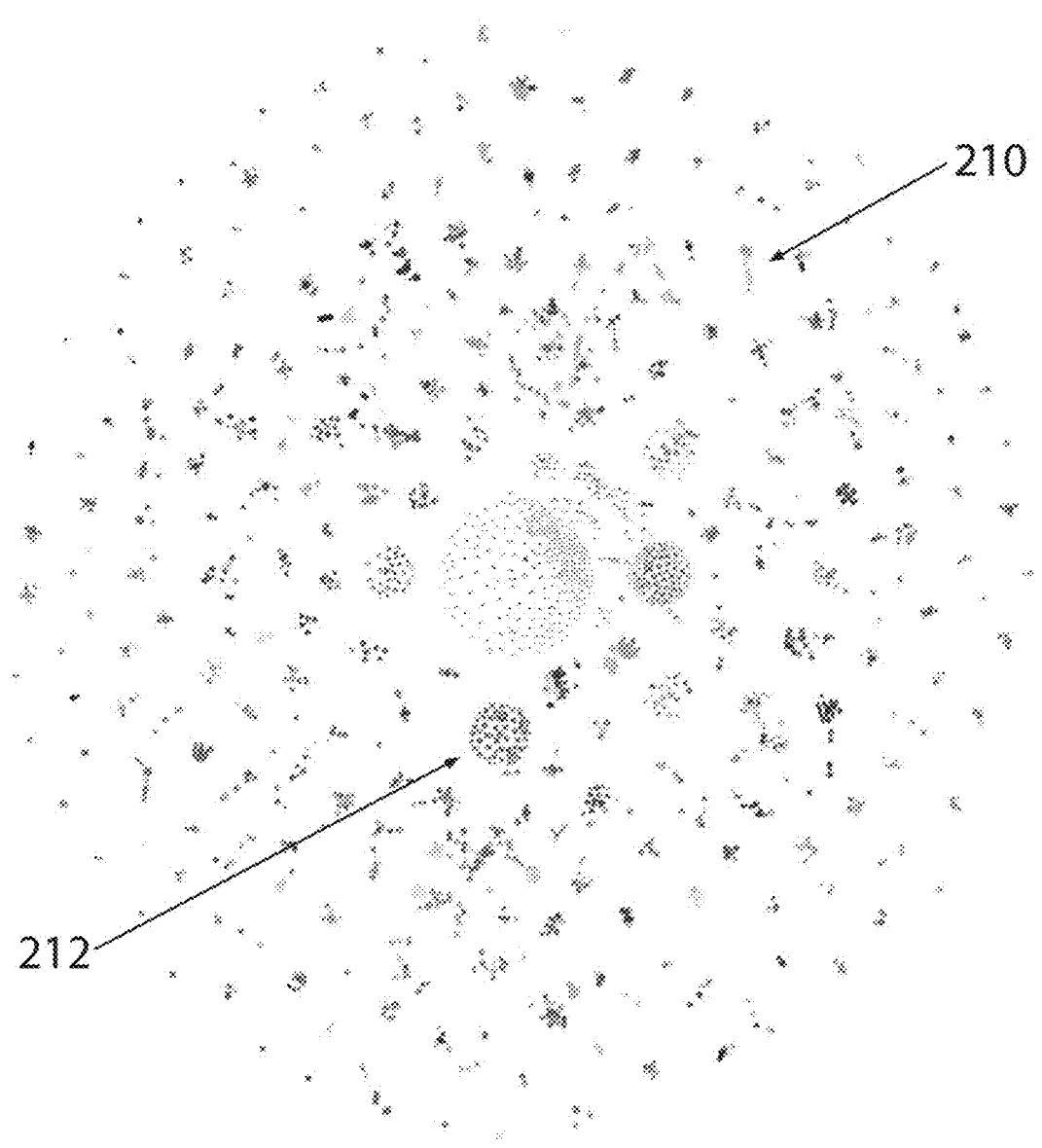
FIG. 2 is a 2-dimensional visualization of a universe of learned CPG classes grouped together by semantic similarity.

FIG. 2 is a 2-dimensional visualization of a universe of learned CPG classes grouped together by semantic similarity. CPG groups 210 and 212 are two examples of similarity sets that are dynamically clustered based on deep semantic features of the CPG images.

Figure 3:
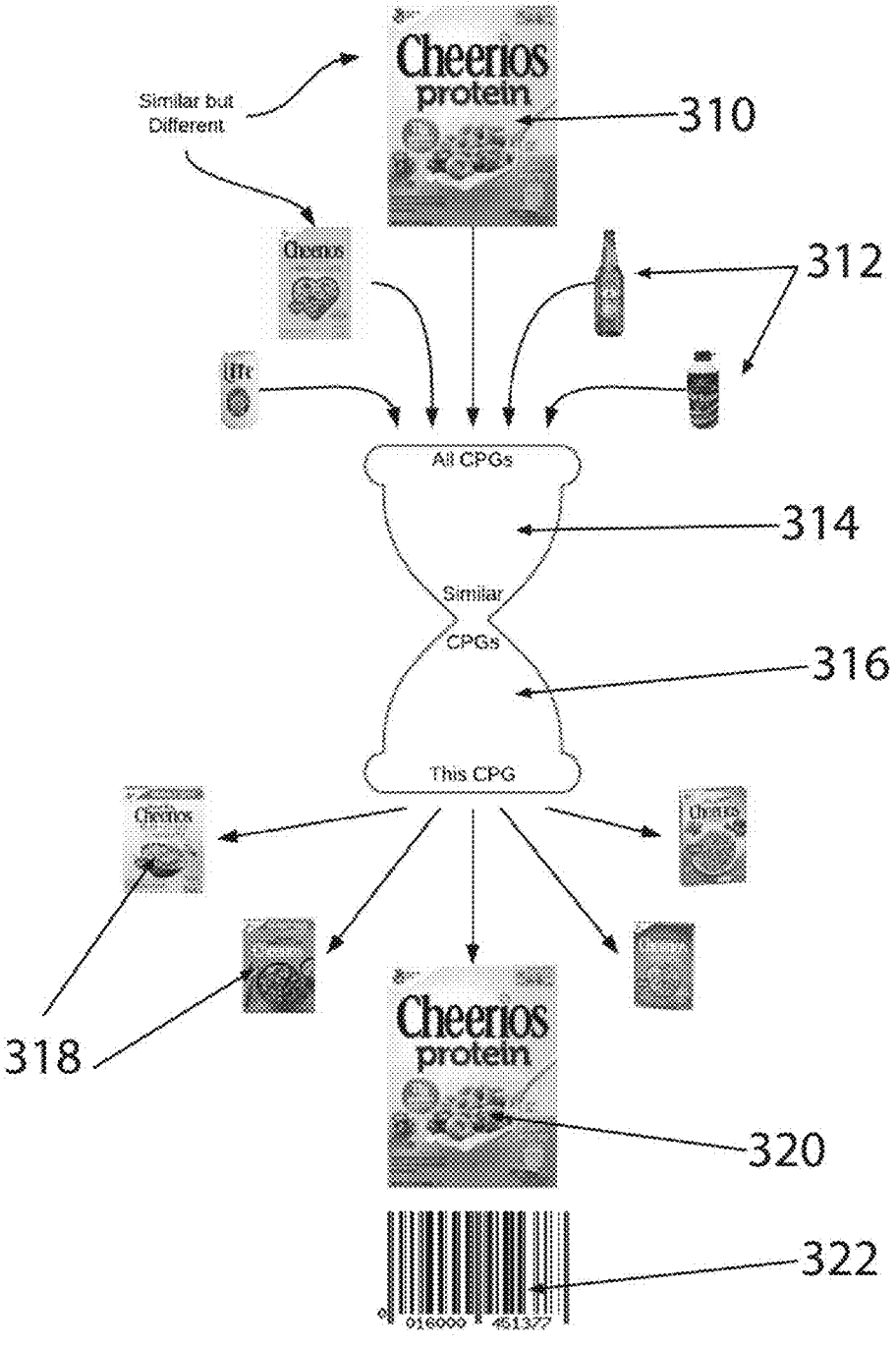
FIG. 3 is an illustration of the overall run-time flow showing how individual cropped images are first compared to all other existing classes, then discriminated from those similar classes to produce a singular classification.

FIG. 3 illustrates the overall run-time flow showing how individual cropped images are first compared to all other existing classes, then discriminated from those similar classes to produce a singular classification. All the CPGs currently known to the system 312 are compared with the product to be classified 310. The set of all products is reduced 314 to a small set of CPGs that are semantically similar to 310. The system then discriminates 316 between the similar products 318 by identifying (often very small) differences between them to produce a single product class 320 together with a confidence score for the classification. The resulting product class is identified by a UPC (GTIN) code 322.

Figure 4:
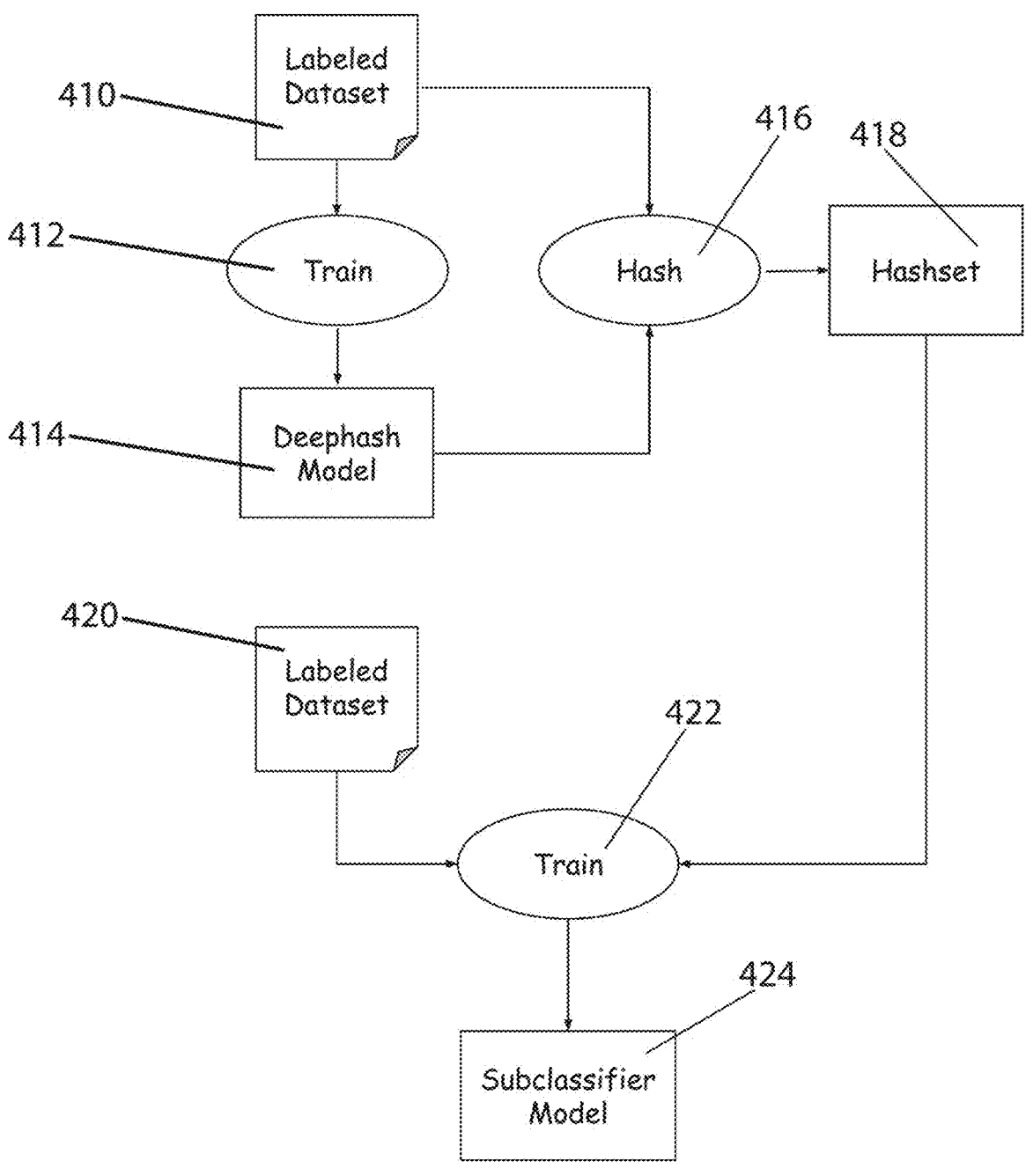
FIG. 4 is a flowchart depicting how the classifier models are trained to first reduce the universe of all identifiable classes into a smaller set of similarity sets and then discriminate between them using fine-grained semantic features.

FIG. 4 shows how the classifier models are trained to first reduce the universe of all identifiable classes into a smaller set of similarity sets and then discriminate between them using fine-grained semantic features. The training regime begins with a Labeled Dataset 410 of new product images that are labeled with their respective class identifiers (UPCs). First, an artificial neural network is trained 412 to extract semantic features from the labeled images and compute a deep hash for each product image. In some embodiments, this is a binary or near binary vector that can be used to efficiently compare CPGs to find semantically similar ones.

A deep hash model 414 is then used to generate 416 a set of hashes for each of the CPG images in the labeled dataset 410 and produce a hash set 418. Not every new labeled dataset 410 requires that both the train 412 and hash 416 steps be performed. An optimization for smaller additional datasets is to use the existing, already trained, deep hash model 414 to simply generate a new hash set 418 for the new products. Finally, the generated hash set 418 is used, along with another (or perhaps the same) labeled dataset 420 to train 422 the subclassifier model 424. When suitably trained, the subclassifer model 424 can contrast each individual CPG cropped image with others that have the same hash to accurately identify its class (UPC).

In some embodiments, the deep hash model is similar to those used in image search services (such as, for example, a Google Image Search) to quickly locate semantically similar images, even if they have been rotated, cropped, or similarly modified.

In some embodiments, the image hashes are binary or near-binary vectors of relatively small dimensionality that are semantic-preserving and efficiently comparable by, for example, using a Hamming distance metric. In embodiments of this type, two objects with hashes that differ only in a small number (usually one or two) bit positions may be considered semantically close to one another.

In some embodiments, the subclassifer model is a type of "one-shot" or "few-shot" neural network designed to be trained with, respectively, just one or just a few training images. The training focuses on the differences between each new training image when compared to others in the same similarity set.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A method for assigning a classification to consumer packaged goods (CPGs), comprising:

capturing an image of a plurality of CPGs arranged on a shelf;

providing the captured image to a CPG detector;

identifying all of the CPGs in the image;

producing a set of cropped images, wherein each cropped image shows a single CPG as it appears in the image; and for each member of the set of cropped images, assigning a classification to the CPG in the member of the set of cropped images and establishing a confidence for the assigned classification through a process that includes the steps of (a) identifying a first set of reference images of CPGs whose classification is known, wherein each member of the first set of reference images is semantically similar to the member of the set of cropped images, and (b) identifying details in the member of the set of cropped images that differentiates it from a second set of reference images of CPGs whose classification is known;

wherein each of the CPGs in the first set of reference images is assigned to a superclass, and wherein assigning a classification to the CPG in the member of the set of cropped images includes (a) training a subclassifier to recognize differences between CPGs in the same superclass, thereby obtaining a trained subclassifier, and (b) using the trained subclassifier to recognize differences between CPGs in the same superclass.

2. The method of claim 1, wherein training a subclassifier to recognize differences between CPGs in the same superclass includes training the subclassifier on a first set of product images, wherein each product image in the first set of product images has a specified class identifier.

3. The method of claim 2, further comprising:

using an artificial neural network to extract semantic features from the first set of product images.

4. The method of claim 3, further comprising:

using the artificial neural network to compute a deep hash for each image in the first set of product images, thereby producing a hash set.

5. The method of claim 4, wherein the deep hash is a vector.

6. The method of claim 5, further comprising:

using the vector to compare CPGs in the first set of product images and to determine which CPGs in the first set of product images are semantically similar to each other.

7. The method of claim 4, wherein the vector is a binary vector.

8. The method of claim 4, further comprising:

using the hash set to train the subclassifier.

9. The method of claim 4, further comprising:

using the hash set and the first set of product images to train the subclassifier.

10. The method of claim 4, further comprising:

using a second set of product images which are distinct from the first set of product images to train the subclassifier.

11. The method of claim 10, further comprising:

using the trained classifier to contrast each cropped image with at least one image from the first set of product images which has the same deep hash as the cropped image, thereby identifying the class of the product in the cropped image.

12. The method of claim 11, wherein the class of the product is a UPC class.

13. A system for assigning a classification to consumer packaged goods (CPGs), comprising:

an image capture device mounted on a mobile platform, said image capture device being adapted to capture images of CPGs arranged on a shelf;

a CPG detector which accepts images captured by the image capture device and which identifies CPGs in the captured images;

an image cropper which produces cropped images from the captured images such that each cropped image shows a single CPG as it appears in the image; and a classifier which operates on each cropped image produced by the image cropper to assign a classification to the CPG in the cropped image and to establish a confidence for the assigned classification, wherein the classifier (a) identifies a first set of reference images of CPGs whose classification is known, wherein each member of the first set of reference images is semantically similar to the member of the set of cropped images, and (b) identifies details in the member of the set of cropped images that differentiates it from a second set of reference images of CPGs whose classification is known;

wherein each of the CPGs in the first set of reference images is assigned to a superclass, and further comprising a subclassifier which recognizes differences between CPGs in the same superclass.

14. The system of claim 4, further comprising: a trainer which trains the subclassifier on a first set of product images to recognize differences between CPGs in the same super-class, wherein each product image in the first set of product images has a specified class identifier.

15. The system of claim 14, further comprising:

an artificial neural network which extracts semantic fea-tures from the first set of product images.

16. The system of claim 15, wherein the artificial neural network computes a deep hash for each image in the first set of product images, thereby producing a hash set.

17. The system of claim 16, wherein the deep hash is a vector.

18. The system of claim 17, wherein the artificial neural network uses the vector to compare CPGs in the first set of product images and to determine which CPGs in the first set of product images are semantically similar to each other.

19. The system of claim 16, wherein the vector is a binary vector.

20. The system of claim 16, wherein the trainer uses the hash set to train the subclassifier.

21. The system of claim 16, wherein the trainer uses the hash set and the first set of product images to train the subclassifier.

22. The system of claim 16, wherein the trainer uses a second set of product images which are distinct from the first set of product images to train the subclassifier.

23. The system of claim 22, wherein the trained classifier identifies the class of the product in the cropped image by contrasts each cropped image with at least one image from the first set of product images which has the same deep hash as the cropped image.

24. The system of claim 23, wherein the class of the product is a UPC class.

* * * * *